(12) United States Patent
Katoh et al.

(10) Patent No.: US 7,530,009 B2
(45) Date of Patent: May 5, 2009

(54) DATA STORAGE METHOD AND DATA STORAGE DEVICE

(75) Inventors: Katsuhiko Katoh, Fujisawa (JP);
Takashi Kuroda, Chigasaki (JP);
Hiroshi Uchiike, Fujisawa (JP);
Yasuhiro Takase, Zama (JP)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 11/530,195

(22) Filed: Sep. 8, 2006

(65) Prior Publication Data

US 2007/0022359 A1    Jan. 25, 2007

Related U.S. Application Data

(62) Division of application No. 10/411,549, filed on Apr. 10, 2003, now Pat. No. 7,107,510.

(30) Foreign Application Priority Data

May 22, 2002    (JP)    ............................. 2002-148290

(51) Int. Cl.
*H03M 13/00*    (2006.01)
(52) U.S. Cl. ........................ 714/785; 714/763; 714/784
(58) Field of Classification Search ................. 714/781, 714/785, 763, 784
See application file for complete search history.

(56) References Cited

U.S. PATENT DOCUMENTS

| 5,428,630 | A | 6/1995 | Weng et al. ................. 371/40.1 |
| 5,812,564 | A | 9/1998 | Bonke et al. ................ 371/40.1 |
| 6,317,858 | B1* | 11/2001 | Cameron ..................... 714/785 |
| 6,453,441 | B1* | 9/2002 | Daoudi et al. ................ 714/784 |
| 6,543,026 | B1 | 4/2003 | Dadurian ..................... 714/785 |
| 2003/0147167 | A1* | 8/2003 | Asano et al. ................... 360/53 |

* cited by examiner

*Primary Examiner*—Esaw Abraham
(74) *Attorney, Agent, or Firm*—Harrington & Smith, PC

(57) ABSTRACT

A data storage device comprising a disk storage medium containing user data in a plurality of sectors wherein each of the plurality of sectors comprises a subdivision of a track, a head for writing or reading the user data and error correcting means for correcting an error that occurs in the user data during the reading process. The error correcting means comprises a syndrome generator for generating syndromes on the basis of the user data, a Euclid circuit, a chien search circuit and a verification circuit, and makes the error correction using a first error correcting code appended to each of a plurality of sectors and a second error correcting code appended to said sector for every block composed of a predetermined number of sectors.

8 Claims, 9 Drawing Sheets

DATA STORAGE METHOD AND DATA STORAGE DEVICE

PRIORITY

This application is a Divisional of and claims benefit of U.S. Ser. No. 10/411,549 filed Apr. 10, 2003, now U.S. Pat. No. 7,107,510.

FIELD OF THE INVENTION

The present invention relates to a data storage device represented by a hard disk drive and, more particularly, to error correction of the data read from the data storage medium.

BACKGROUND ART

The hard disk drive is one of the most popular external storage devices for the computer. A magnetic disk that is the storage medium for the hard disk drive has the minimum storage unit of a sector which is a subdivision of a track on a disk surface like a tree ring, as well known.

The hard disk drive has a magnetic head for reading out the data stored in the magnetic disk or writing the data into the magnetic disk. This magnetic head is mounted on an actuator mechanism that is oscillated by a VCM (Voice Coil Motor).

In reading or writing the data, the magnetic head is moved to a predetermined track and positioned by driving the actuator mechanism. The magnetic head is controlled to be moved to the predetermined position in accordance with the servo information stored on the magnetic disk. The hard disk drive has a high storage density per unit of area and a low S/N ratio in a signal processing system, so that the presence of magnetic defect on the magnetic disk can not be ignored. Therefore, it is important to make the error correction to enhance the reliability of data to be read or written irrespective of the presence of defect on the magnetic disk.

The error correction is made if the read data contains any error. An error occurs due to exfoliation of a magnetic layer formed on the magnetic disk, scratch of the magnetic disk caused by the magnetic head, or contamination on the magnetic disk. For this error correction, the hard disk drive has a parity of several tens bytes added for every sector (usually 512 bytes) of data on the magnetic disk, as shown in FIG. 7. This parity is called an ECC (Error Correcting Code). The ECC is generated from the user data (User Data) of each sector as the information word, without correlation with the user data in other sectors.

In reading the user data, an error location is detected on the basis of the ECC data produced by an ECC circuit provided on the hard disk drive and the read parity (ECC) to perform an error correcting process.

In the hard disk drive at present, if a TA (Thermal Asperity) or scratch occurs, the user data of several tens of bytes to hundreds of bytes may be broken at a time due to increased storage density. Therefore, the ECC is required to have a greater error correction capability, but to enhance the error correction capability of the ECC, the ECC is necessary to have more redundancy. If the redundancy is increased, a greater ECC percentage (overhead of code) is occupied on a disk format. And if the overhead of code is typically more than 15%, the error correction results in zero benefit.

Conventionally, each sector is treated as an independent information word, with the ECC appended to each information word. In this case, if an error occurs beyond the ability of appended ECC, the error correction is uncorrectable. To correct a severe error that occurs rarely, it is necessary to append the larger ECC, resulting in a problem that the overhead of code is increased.

To cope with this problem, it is effective to have a method for multilevel encoding the ECC. For example, in a case of triple encoding, the ECC for each sector is C1, the ECC for four sectors having greater error correction capability than C1 is C2, and the ECC for eight sectors having greater error correction capability than C2 is C3, in which the information word of C2 is exclusive OR of the user data in the consecutive four sectors, and the information word of C3 is exclusive OR of the user data in the consecutive eight sectors. This method is referred to as an ISF in this specification.

Referring to FIGS. 8 and 9, the ISF will be described below.

In FIG. 8, eight sectors from sector 0 to sector 7 on the magnetic disk are shown. As the ECC, C1 is contained in each of the sectors 0 to 7, C2 is contained in sector 3, and C3 is contained in sector 7. As shown in FIG. 9, sector 0 (user data 0), sector 1 (user data 1) and sector 2 (user data 2) are exclusive ORed (XOR) to have the virtual user data, with the correlation in the sectors 0 to 2. And C2 having greater error correction capability than C1 is generated in the virtual user data, whereby even if the error is uncorrectable with C1, the error correction can be made with C2. Since C1 contains C2, only C2-C1 bytes of C2 are actually stored on the magnetic disk. In this way, if an uncorrectable error occurs with C1, the error correction with C2 is enabled by reading four sectors. If the error is uncorrectable with C2, the error correction with C3 is enabled by reading eight sectors. Since C2 and C3 for the ECC having greater error correction capability are stored for a plurality of sectors only once, the error correction with greater ability is enabled without increasing the overhead of code over the conventional one. In the above example, a set of four sectors containing one C2 is defined as a block or C2 block.

In FIG. 8, C2 is stored before C1 in sector 3, and C3 is stored before C2 in sector 7. This format is desirably employed to reduce the number of gates and simplify the processing, because C2 and C3 are the information word of C1, and in a format where C2 and C3 are stored after C1, a write buffer is required in writing the user data, and the processing is very complex.

For example, in a case where C1 has 52 bytes, C2 has 16 bytes and C3 has 40 bytes, the conventional hard disk drive enables the error correction of 66 bytes at maximum to be made at an overhead of 13%, while the ISF enables the error correction of 104 bytes at maximum to be made at an overhead of 10.6%.

In a current situation where the ECC has an almost limited number of bytes to be appended to one sector, the ISF with the possibility of greater error correction capability is a very powerful encoding method.

PROBLEMS TO BE SOLVED BY THE INVENTION

Thus, it is an object of the present invention to provide a data storage device that can avoid a hardware error due to deletion of about 100 bytes or a scratch, which conventionally resulted in the hardware error, by providing the peripheral technologies to actually implement the ISF. Also, it is another object of this invention to provide a data processing method for use with the data storage device.

SUMMARY OF THE INVENTION

In order to achieve the above object, some problems in actually implementing the ISF and means for solving the problems are described below in succession.

In the above example, it is required that the information word of C2 is exclusive OR (XOR) of the user data in consecutive four sectors, and the information word of C3 is exclusive OR (XOR) of the user data in consecutive eight sectors. In an apparatus employing the product code such as a DVD drive, the user data is once stored in the buffer of an SRAM (Static Random Access Memory) at the time of writing on the magnetic disk, and encoded. However, in encoding with the buffer, it is necessary to perform an operation of once storing the user data in the SRAM and reading it from the SRAM, and in the ISF, with a method for exclusive ORing the user data in four sectors and storing and encoding the user data in the SRAM at the time of encoding C2, four sectors are actually written, but the user data of five sectors must be encoded, resulting in worse performance at the write time.

In the ISF, C2 is provided for every four sectors, and C3 is provided for every eight sectors, for example, but it is required to enter 00h of C3-C1 for the sectors not having C2 and C3, or 00h of C3-C2 for the sectors having C2 but not having C3, after the user data as the information word of C1, at the time of encoding. The number of entering dummy 00h is dependent on a difference in the error correction capability between C1 and C3. It is presupposed that C3 is decoded offline, and to correct a large burst error due to a scratch with C3, there is a great difference in the error correction capability between C1 and C3, whereby about 56 bytes of 00h are required to enter in the sectors having C1 alone. When the four interleave is employed, about ten bytes are required for each interleave. Herein, to enter 56 bytes of 00h, 56 cycles are required in a byte encoder. If 00h is entered over 56 cycles with the system clock, the user data of the next sector arrives before the ECC is reproduced, whereby it is required to prepare for the encoder of not byte width but multi-word width. Namely, there is a problem that the time for entering dummy 00h over 56 cycles with the system clock can not be taken.

In view of the above-mentioned problems, one exemplary embodiment of the present invention provides a data storage device comprising a disk storage medium having a plurality of sectors containing the user data wherein each of the plurality of sectors comprises a subdivision of a track, a head for performing a writing process or a reading process into or from the disk storage medium upon a write command or a read command transferred from a host, and error correcting means for correcting an error that occurs in the user data during the reading process, wherein the error correcting means makes the error correction, using a first error correcting code appended to each of a plurality of sectors and a second error correcting code appended to said sector for every block composed of a predetermined number of sectors; and comprises a syndrome generator for generating a syndrome on the basis of the user data, a Euclid circuit, a chien search circuit and a verification circuit. The Euclid circuit is for constructing an error locator polynomial and an error evaluator polynomial on the basis of the syndrome generated by said syndrome generator. The chien search circuit is for solving said error locator polynomial and said error evaluator polynomial. And the verification circuit is for verifying the validity of the solutions of the error locator polynomial and the error evaluator polynomial in the chien search circuit, and further wherein an operation process for updating the syndrome after the end of making an error correcting process with the first error correcting code is performed using the Euclid circuit and the chien search circuit, wherein the Euclid circuit comprises a general-purpose multiplier, the chien search circuit comprises a first resister and the operation process is performed by the general-purpose multiplier to acquire a first operation result, which is saved temporarily in the first register.

The error correcting means may comprise command start detecting means for detecting the start of the read command and outputting the detected result to the first register and the second register. And the first register and the second register have their stored states cleared upon receiving the detected result. Namely, when the read command is started, the first register and the second register have no data. From this state, a syndrome generated on the basis of the user data contained in the initial sector regarding the command is stored in the first register. At this time, the second register is still kept in the clear state.

In the data storage device of the invention, after the end of generating the syndrome for all the user data contained in the initial sector, the value stored in the first register and the value stored in the second register are exclusive ORed and the result is stored in the second register.

The first register has its stored state cleared upon receiving a signal indicating that the succeeding sector following the initial sector starts to be transferred. Then, the first register stores the syndrome generated by the syndrome generator on the basis of the user data contained in the succeeding sector. And the exclusive OR circuit exclusive ORs the value stored in the first register and the value stored in the second register after the end of generating the syndrome for all the user data contained in the succeeding sector and storing the exclusive OR in the second register.

In the data storage device of the invention, the error correcting means may comprise sector discriminating means for discriminating whether or not the sector is a specific sector containing a predetermined multilevel encoded error code (error correcting code). In this case, the second register has its stored state cleared at a certain time after the sector discriminating means discriminates the specific sector. Presupposing that C2 is appended to the fourth sector in the OTF (on the fly correction), the second register is cleared to prepare for the next four sectors if the above process is ended for the fourth sector.

With the above data storage device, a data processing method is implemented as follows.

According to an exemplary embodiment this invention provides a data processing method to correct data for errors, using a first error correcting code appended to each of a plurality of sectors and a second error correcting code appended to each sector for every block composed of a predetermined number of sectors, the method comprising generating a syndrome on the basis of the data by a syndrome generator, calculating an error locator polynomial and an error evaluator polynomial on the basis of the generated syndrome, solving the error locator polynomial and the error evaluator polynomial, and verifying the validity of the solutions of the error locator polynomial and the error evaluator polynomial with a chien search circuit. Each of the plurality of sectors comprises a subdivision of a track, and an operation process for updating the syndrome after performing an error correcting process with the first error correcting code is performed by calculating the error locator polynomial and the error evaluator polynomial and solving the error locator polynomial and the error evaluator polynomial. Calculating the error locator polynomial and the error evaluator polynomial comprises a multiplying algorithm and solving the error locator polynomial and the error evaluator polynomial comprises storing results in a first register. The operation process is performed by the multiplying algorithm to acquire a first operation result, which is saved temporarily in the first register.

By the way, the ISF deals with not a plurality of sectors, but the correlation (exclusive OR) of the user data in the plurality of sectors as the information word, and has a merit that there is no need of extending the field, though the error in the data of four sectors is correctable. However, this also means that when only one of the four sectors is uncorrectable with C1, the error is correctable, but when all the four sectors are uncorrectable with C1, the error is uncorrectable with C2. Therefore, in the ISF, when an error correctable with C1 or C2 is found, it is required that the syndrome update for that error is made for the syndromes of C2 and C3. And this is requisite when the OTF (on-the-fly correction) is to be made with the code word (C2) at the upper level. The OTF is a method for correcting the error without interrupting the transfer of data, while reading the data in succession. However, if the OTF is not made with the code word (C2) at the upper level, all the error locations/patterns for the four or eight sectors are saved in the SRAM, whereby the firmware can modify the syndrome via the MPU.

Typically, to modify the syndrome, the following expression is used.

$$Syn(n) = PAT X \alpha^{(LOC \times n)}$$

Where PAT is the error pattern, LOC is the error location, $\alpha$ is a symbol in the Galois field, and n is a number from 0 to order of C3-1.

C2 enables the error correction of sector that is uncorrectable with C1, and C3 enables the error correction of sector that is uncorrectable with C2. Accordingly, the order of C2 is higher than that of C1, and the order of C3 is higher than that of C2. Therefore, in modifying the syndromes for C2 and C3, a lot of general-purpose multipliers and a group of working registers are necessary. In addition, all the error locations/patterns for that sector are solved, and the verification with CRC is made. However, unless the syndrome update is made after the end of verification, mis-correction may be made in reality, or if the interleaving is used, the syndrome update may be made by mistake when the error is uncorrectable with any interleaving, or the syndrome update is made only with the correctable interleaving, whereby it occurs that the data stored in the sector buffer is not modified, but no error is reported in calculation of the syndrome. Accordingly, the syndrome update must be made at high rate after verification with the CRC. Also, there is an unrealistic problem that when the ROM is accessed by n times to acquire the value of $\alpha$ to the power of (LOC X n) to be used in the syndrome update, a great number of cycles are required.

In view of the above-mentioned problems, the invention provides a data storage device comprising a disk storage medium having a plurality of sectors containing the user data, a head for performing a writing process or a reading process into or from the disk storage medium upon a write command or a read command transferred from a host, and error correcting means for correcting an error that occurs in the data during the reading process, wherein the error correcting means makes the error correction, using a first error correcting code appended to each of a plurality of sectors and a second error correcting code appended to the sector for every block composed of a predetermined number of sectors and having a greater correction capability than the first error correcting code; and comprises a syndrome generator for generating a syndrome on the basis of the user data, a Euclid circuit for constructing an error locator polynomial and an error evaluator polynomial on the basis of the syndrome generated by the syndrome generator, a chien search circuit for solving the error locator polynomial and the error evaluator polynomial, and a verification circuit for verifying the validity of the solutions of the error locator polynomial and the error evaluator polynomial in the chien search circuit, wherein an operation process for updating the syndrome after the end of making an error correcting process with the first error correcting code is performed using the Euclid circuit and the chien search circuit. The data storage device of the invention performs the operation process for the syndrome update employing the Euclid circuit and the chien search circuit originally provided for the error correcting means, thereby solving the above-mentioned problems.

In the data storage device of the invention, the Euclid circuit may comprise a general-purpose multiplier and the chien search circuit may comprise a third register, in which the operation process is performed by the general-purpose multiplier to acquire a first operation result, which is then saved temporarily in the third register. For example, the value of $\alpha$ to the power of (LOC X n) is calculated by the general-purpose multiplier, and its result is temporarily saved in the third register within the chien search circuit.

Also, in the data storage device of the invention, the general-purpose multiplier may further perform the operation process, using the result of the operation process saved temporarily in the third register, to acquire a second operation result. For example, a product of the value of $\alpha$ to the power of (LOC X n) temporarily saved in the chain register and the error value is calculated.

Moreover, in the data storage device of the invention, the Euclid circuit may comprise a fourth register to generate a value for updating the syndrome on the basis of the second operation result and save it temporarily. For example, the second operation result and the value of the fourth register are exclusive ORed and its result is saved in the fourth register.

With the above data storage device, a data processing method is provided as follows. The invention provides a data processing method for making the error correction, using a first error correcting code appended to each of a plurality of sectors and a second error correcting code appended to the sector for every block composed of a predetermined number of sectors and having a greater correction capability than the first error correcting code, the method comprising generating a syndrome on the basis of the user data, calculating an error locator polynomial and an error evaluator polynomial on the basis of the syndrome generated, solving the error locator polynomial and the error evaluator polynomial, and verifying the validity of the solutions of the error locator polynomial and the error evaluator polynomial with a chien search circuit, wherein an operation process for updating the syndrome after the end of making an error correcting process with the first error correcting code is performed using a circuit for calculating the error locator polynomial and the error evaluator polynomial and a circuit for solving the error locator polynomial and the error evaluator polynomial.

In a system employing the multilevel coding, when any number of sectors are exclusive ORed to have the information word, with C2 as the ECC appended to its virtual sector, the CRC for verifying the corrected content with C2 is provided for exclusive use, it is required that the CRC storage area is secured for verification of C2 decode for every unit of C2 block. In this way, even if the multilevel such as C2, C3 and C4 is raised to reduce the overhead of code, the overhead can not be reduced effectively due to the CRC for each ECC. Also, when a correctable error is found within the C2 block, it is required to modify the syndrome and the value of each CRC using its error location/pattern, resulting in a problem that the number of gates or the decode latency is increased.

In view of the above-mentioned problems, the invention provides a data storage device comprising a disk storage medium having a plurality of sectors containing the user data, a head for performing a writing process or a reading process into or from the disk storage medium upon a write command or a read command transferred from a host, and error correcting means for correcting an error that occurs in the user data during the reading process, wherein the error correcting means makes the error correction, using a first error correcting code appended to each of a plurality of sectors and a second error correcting code appended to the sector for every block composed of a predetermined number of sectors and having a greater correction capability than the first error correcting code, and comprises a CRC generating circuit for generating and holding a cyclic redundancy check code CRC for checking the content of error correction on the basis of the user data, a CRC holding circuit for holding the CRC generated by the CRC generating circuit at the read time if the error correction by the first error correcting code is impossible, a verifying CRC selection circuit for selecting the CRC held in either the CRC generating circuit or the CRC holding circuit for the verification, and a CRC verification circuit for verifying the CRC using the CRC selected by the verifying CRC selection circuit. With the data storage device of the invention, because the result of decoding the second error correcting code can be verified by the CRC only with the first error correcting code appended to each sector, when the multilevel encoding is made, there is no need of adding the CRC codes in number corresponding to the multilevel.

The data storage device of this invention may further comprise a syndrome generator for generating the syndromes for the first error correcting code and the second error correcting code on the basis of the user data transferred from the disk storage medium, and an error information calculating circuit for calculating an error location and an error pattern on the basis of the generated syndromes. At this time, the CRC verification circuit verifies the content of error correction by comparing the error location and the error pattern with the CRC generated and held by the CRC generating circuit at the read time.

In the data storage device of this invention, the verifying CRC selection circuit selects the CRC held in the CRC holding circuit in handling the sector containing the second error correcting code as an object of error correction. At this time, the CRC verification circuit verifies the content of error correction using the CRC held in the CRC holding circuit.

With the above data storage device, a data processing method is implemented as follows.

The invention provides a data processing method for making the error correction for the user data, using a first error correcting code appended to each of a plurality of sectors and a second error correcting code appended to the sector for every block composed of a predetermined number of sectors and having a greater correction capability than the first error correcting code, the method comprising generating a cyclic redundancy check code CRC for checking the content of error correction on the basis of the user data, holding the CRC if the error correction with the first error correcting code is impossible, and verifying the content of error correction using the CRC held in handling the sector containing the second error correcting code as an object of error correction.

FIG. 10 shows a timing chart for performing the conventional OTF. At the timings A and B in FIG. 10, the write of sector 1 and the OTF (read-modify-write) of sector 0, and write of sector 2 and OTF of sector 1, are overlapped. Therefore, there is a problem that a very large loss arises in the memory band.

In view of the above-mentioned problems, the invention provides a data storage device comprising a disk storage medium having a plurality of sectors containing the user data, a head for performing a writing process or a reading process into or from the disk storage medium upon a write command or a read command transferred from a host, and error correcting means for correcting an error that occurs in the data during the reading process, wherein the error correcting means makes the error correction, using a first error correcting code appended to each of the plurality of sectors and a second error correcting code appended to the sector for every block composed of a predetermined number of sectors and having a greater correction capability than the first error correcting code, and comprises a first buffer for storing the user data transferred from the disk storage medium, an error correcting circuit for making an error correcting process on the basis of the first error correcting code while reading the user data from the first buffer, and a second buffer for storing the user data subjected to error correction on the basis of the first error correcting code and the user data for which the error correction on the basis of the first error correcting code is impossible.

The data storage device of the invention may further comprise position specifying means for specifying the positional information of the sector for which the error correction on the basis of the first error correcting code is impossible, in which it is desirable that the error correcting circuit reads the user data for which the error correction on the basis of the first error correcting code stored in the second buffer is impossible from the second buffer and makes the error correction on the basis of the second error correcting code, using the positional information specified by the position specifying means. The positional information of sector may be the information for specifying the position of sector within the block.

In the data storage device of the invention, if the user data which is impossible in the error correction on the basis of the first error correcting code stored in the second buffer is determined to be impossible in the error correction using the second error correcting code, the user data of the sector corresponding to the positional information is read from the second buffer and transferred in its state to the outside without the error correcting process.

With the above data storage device, a data processing method is implemented as follows.

The invention provides a data processing method for making the error correction for the user data, using a first error correcting code appended to each of a plurality of sectors and a second error correcting code appended to the sector for every block composed of a predetermined number of sectors and having a greater correction capability than the first error correcting code, the method comprising storing the user data transferred from the disk storage medium in a first buffer, making an error correcting process on the basis of the first error correcting code while reading the user data stored in the first buffer and transferring the user data to a second buffer, and reading the user data stored in the second buffer, for which the error correction on the basis of the first error correcting code is impossible, from the second buffer, and making the error correcting process on the basis of the second error correcting code.

PREFERRED EMBODIMENT

Figure 1:
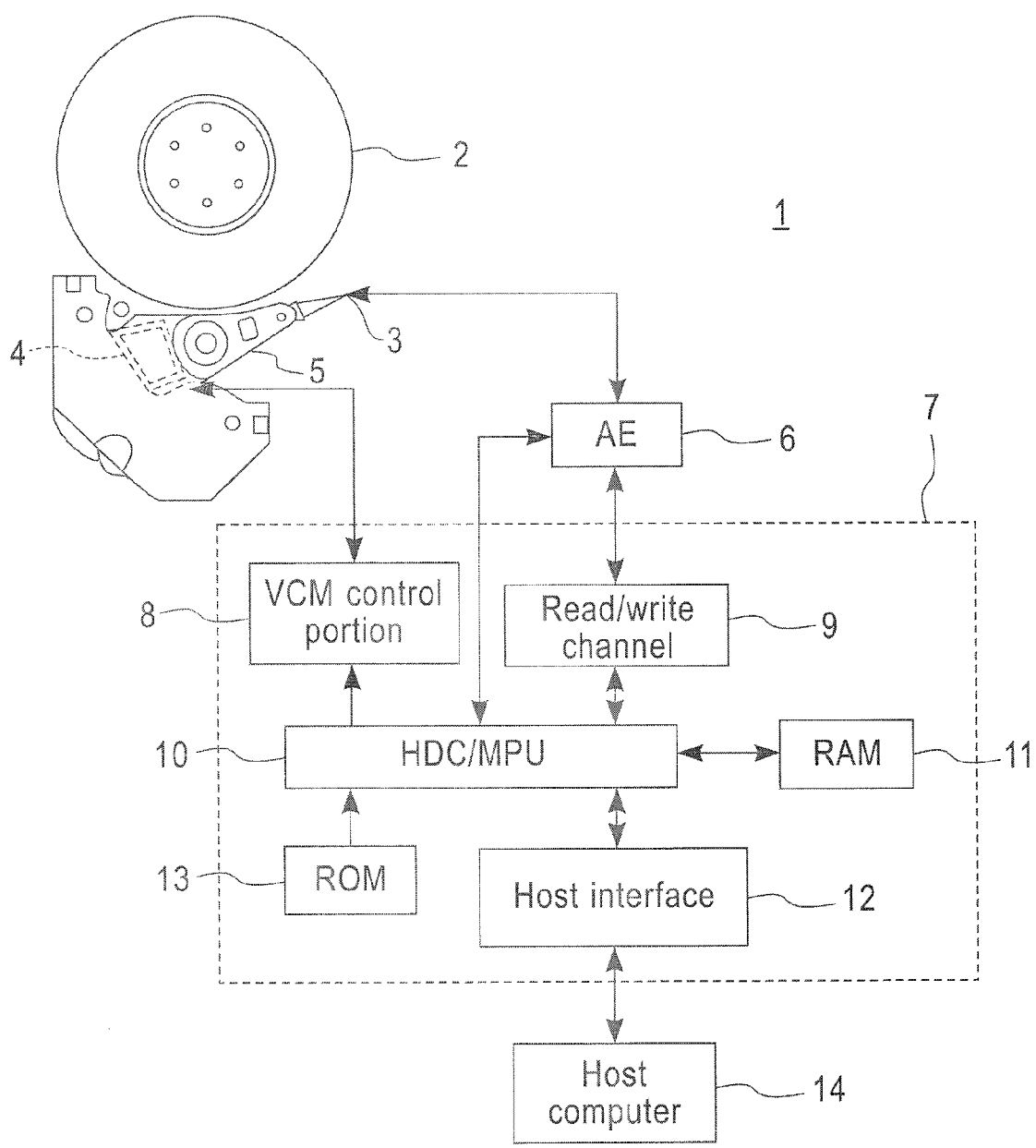
FIG. 1 is a block diagram showing the configuration of a hard disk drive according to an embodiment of the present invention.

The preferred embodiments of the present invention will be described below exemplifying a hard disk drive 1. FIG. 1 is a block diagram showing the basic configuration of the hard disk drive 1.

In FIG. 1, the hard disk drive (HDD) 1 as a data storage device comprises a magnetic disk 2 rotated by a spindle motor (not shown). A magnetic head 3 for performing the read/write operation of the user data from/into the magnetic disk 2 is provided at one end of an actuator arm 5. This magnetic head 3 is composed of a write head for writing the data and a read head for reading the data from the magnetic disk 2. A VCM composed of a VCM (Voice Coil Motor) coil 4 provided at the other end of the actuator arm 5 and a permanent magnet seeks for a predetermined position on the magnetic disk 2.

In FIG. 1, an AE (Arm Electronics) 6 is mounted on the actuator arm 5 to supply a bias current to the read head of the magnetic head 3 and amplify a minute reproduction signal of the read head for reading the data stored in the magnetic disk 2, as well as supplying a write current to the write head at the time of writing.

A control portion 7 controls the operation of the actuator arm 5, and comprises an electronic circuit for reading or writing the data. The control portion 7 controls the seek operation of the actuator arm 5 through a VCM control portion 8 and controls the read/write operation of the magnetic head 3 through a read/write channel 9. The read/write channel 9 is connected to an HDC (Hard Disk Controller)/MPU 10. The read/write channel 9 makes the two-way conversion between a digital data signal and a current signal supplied to the magnetic head 3 or generated in the magnetic head 3.

The HDC/MPU 10 is connected to a memory (RAM) 11 and a host computer 14 via a host interface 12. The HDC/MPU 10 performs the control of the RAM 11, the data transfer between the RAM 11 and the magnetic disk 2, the creation of an ID table, and the generation of a PES (Position Error Signal) from the servo data, and sends the positional information of the magnetic head 3 to the MPU. Also, it performs a series of operations involved in an error correcting process as will be described later. The RAM 11 stores a microcode for apparatus control read from the magnetic disk 2 when initiating the apparatus, and the ID table. The MPU of the HDC/MPU 10 is connected to a memory (ROM) 13 and the VCM control portion 8. The MPU interprets a command sent from the host computer 14 to instruct the HDC to create the ID table, and to read or write the data at an address specified by the command, and sends the control information for enabling the magnetic head 3 to seek for a predetermined track to the VCM control portion 8, on the basis of the positional information of the magnetic head 3 generated by the HDC.

The VCM control portion 8 drives the VCM to position the magnetic head 3 in a predetermined track on the basis of the control information from the MPU. The ROM 13 stores a microcode necessary to initiate the apparatus.

Figure 2:
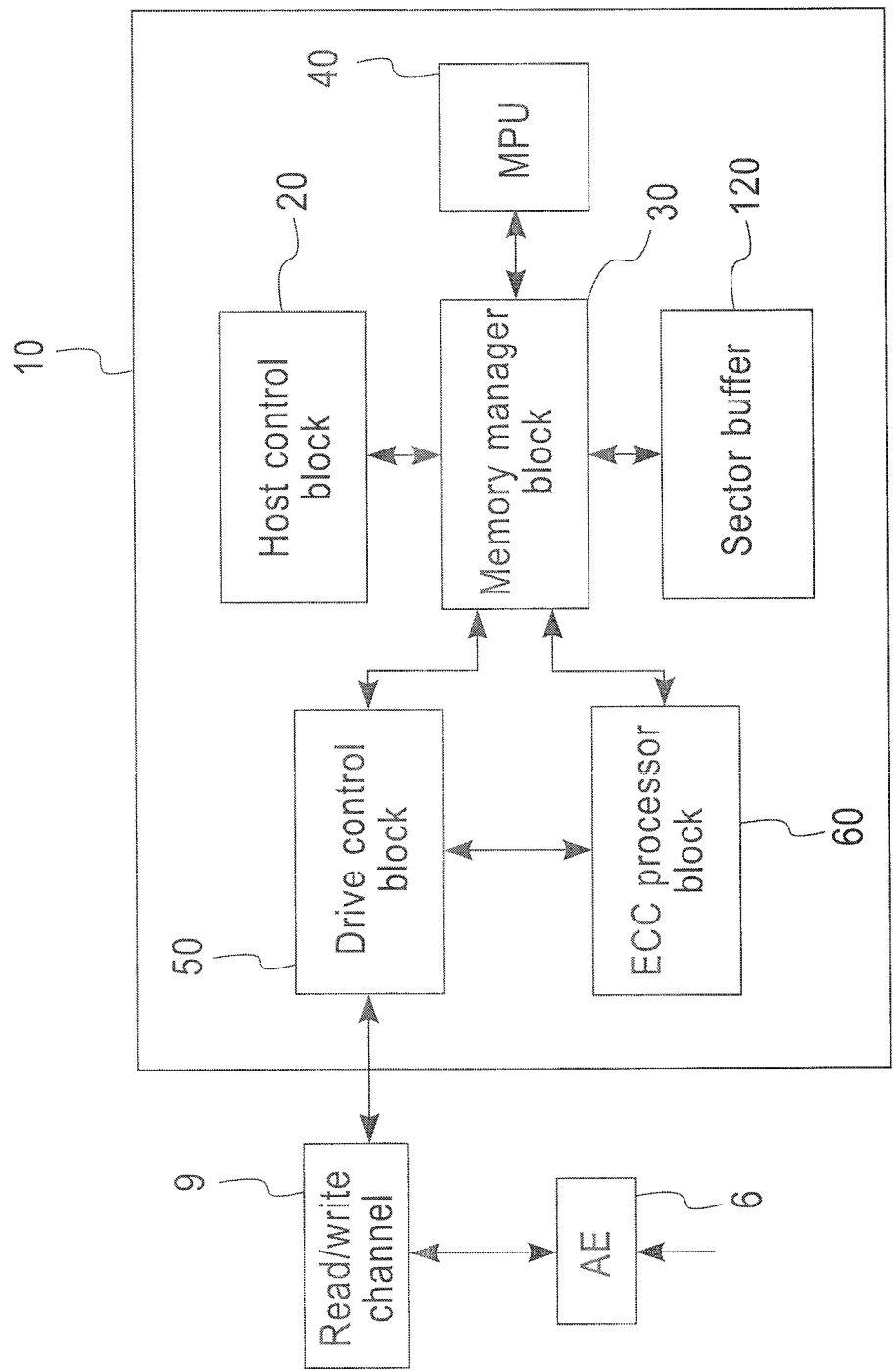
FIG. 2 is a block diagram showing the schematic configuration of an HDC/MPU for a hard disk drive according to the embodiment of the invention.

FIG. 2 shows the schematic configuration of the HDC/MPU 10.

As shown in FIG. 2, the HDC/MPU 10 comprises a host control block 20 having a main function of transferring the data to the host computer 14. The HDC/MPU 10 comprises a memory manager block 30 having a function of interfacing with the MPU 40 and interfacing with the memory devices such as DRAM and SRAM. The HDC/MPU 10 comprises a drive control block 50 having a function of transferring the data to the read/write channel 9. Moreover, the HDC/MPU 10 comprises an ECC processor block 60 having a function of correcting the error that occurs at the time of reading the data.

Figure 3:
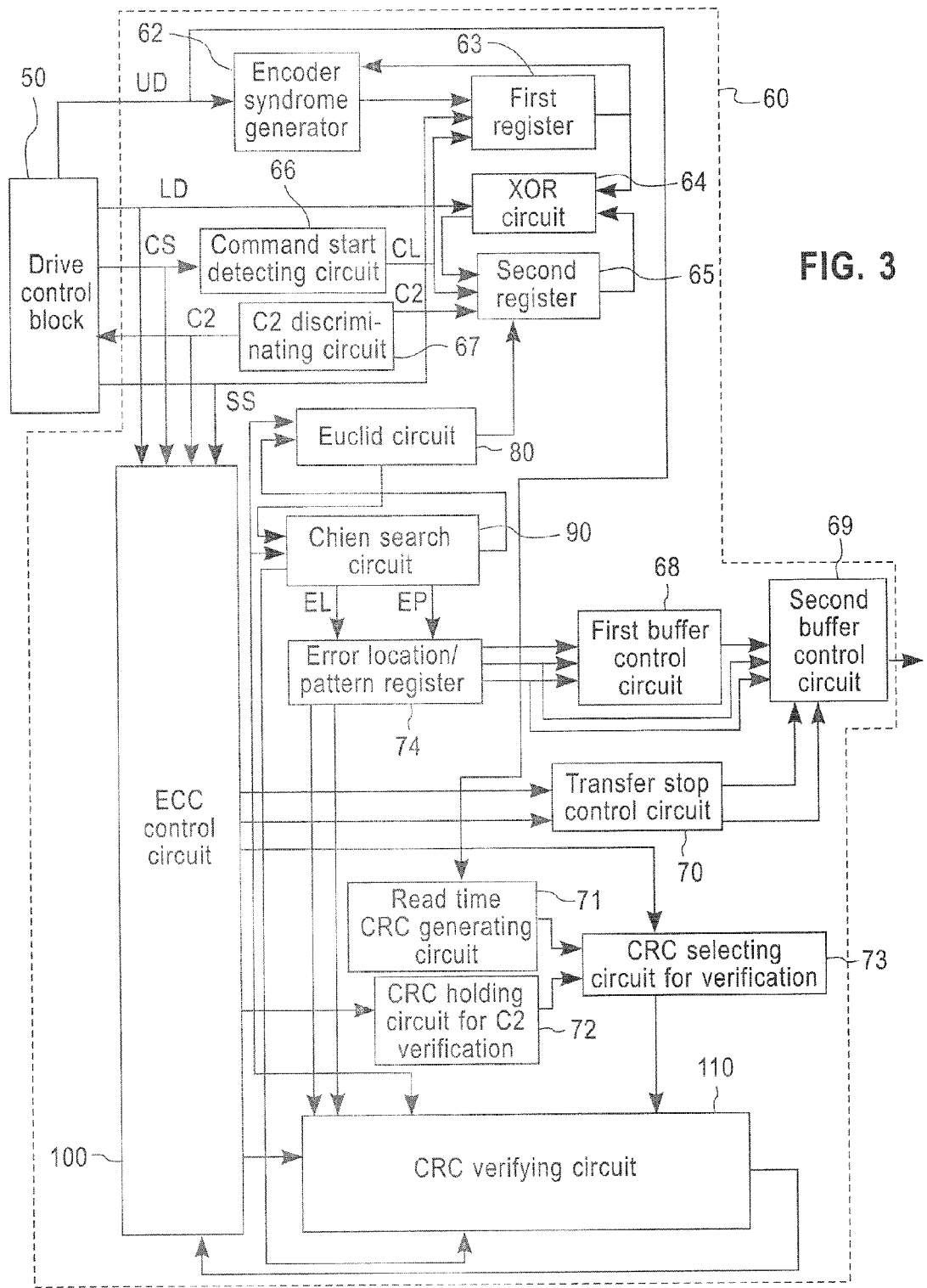
FIG. 3 is a block diagram showing the schematic configuration of an ECC processor block for the HDC/MPU according to the embodiment of the invention.
Figure 8:
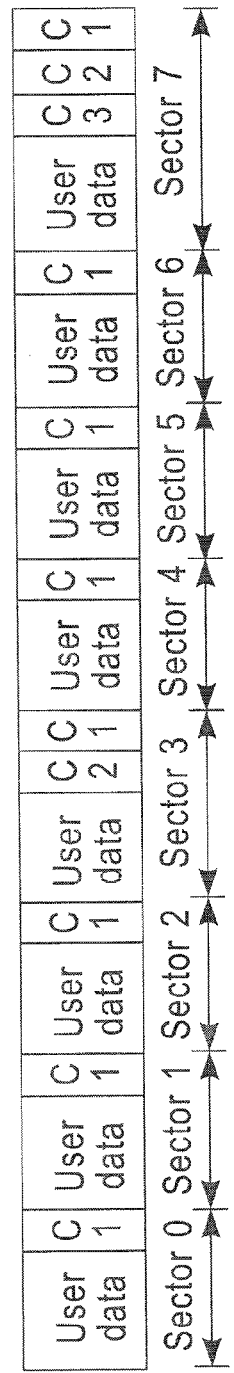
FIG. 8 is a diagram showing an ISF format.
Figure 9:
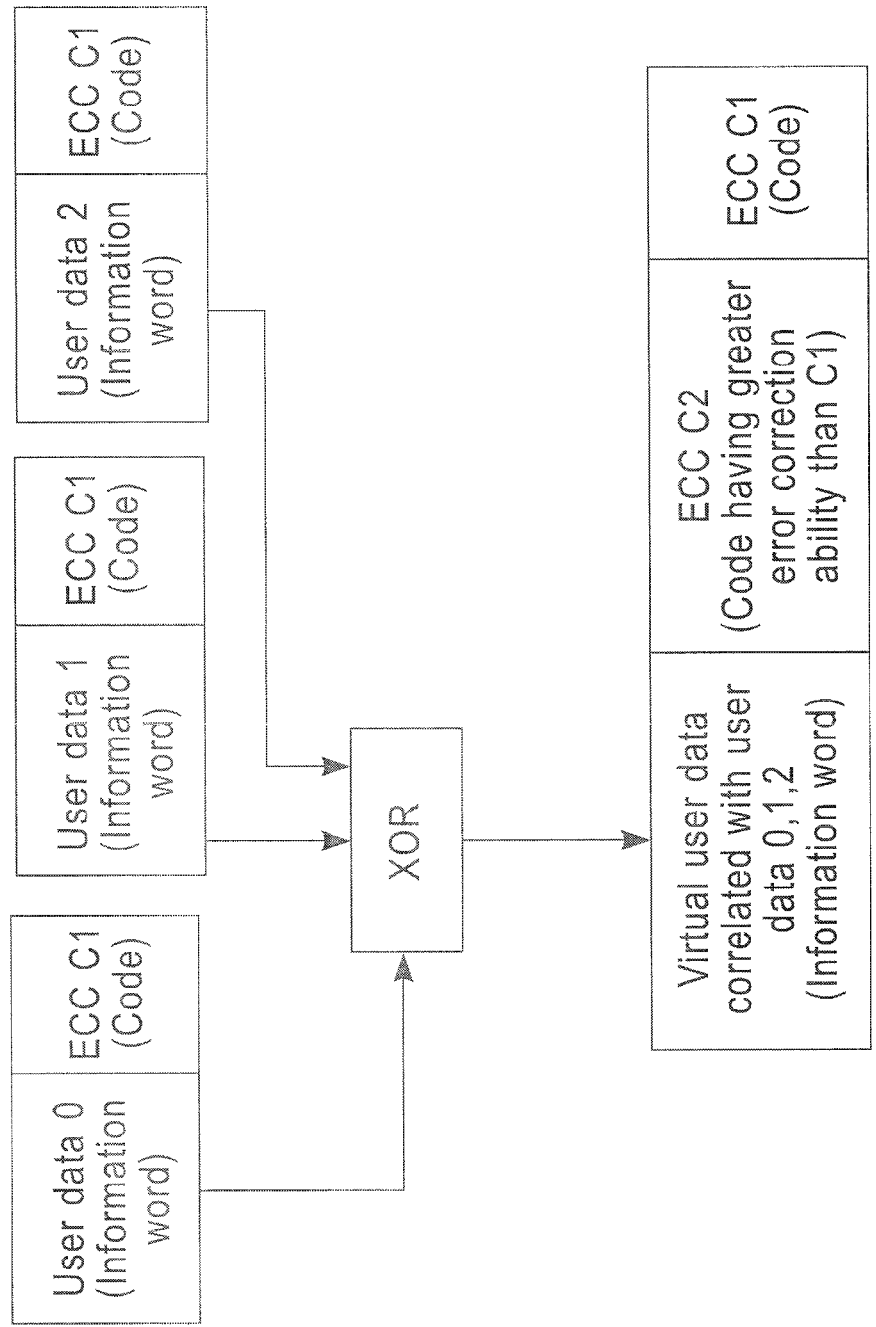
FIG. 9 is a diagram for explaining a way of generating the code word with the ISF.
Figure 10:
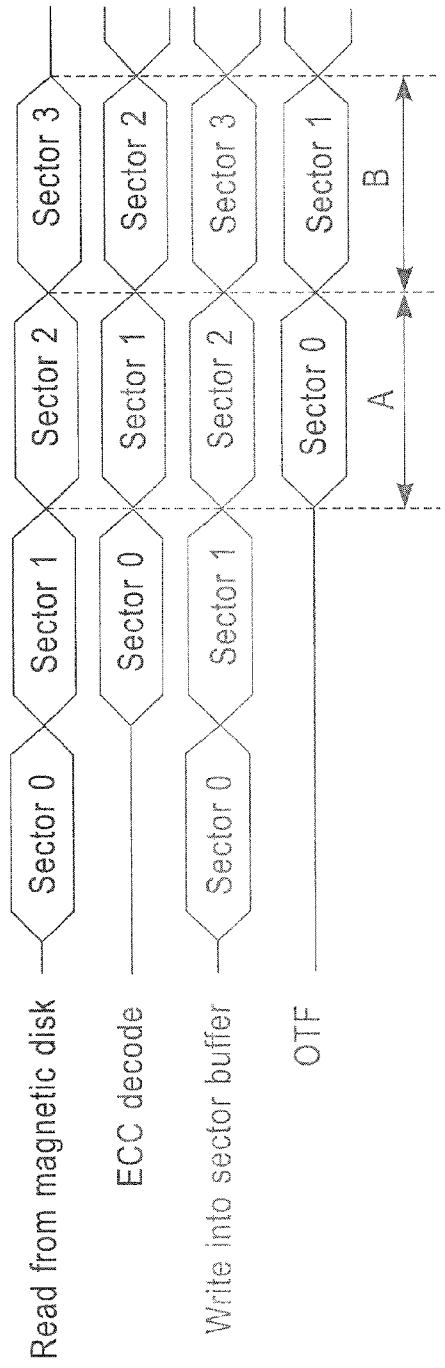
FIG. 10 is a timing chart showing the conventional operation of OTF.

Referring to FIG. 3, which shows the configuration of the ECC processor block 60, the error correction of this embodiment will be outlined. The error correction of this embodiment employs the ISF as described previously and shown in FIGS. 8 and 9. Accordingly, the terms of C1, C2 and so on are synonymous with those as used in FIGS. 8 and 9. The description as given in FIGS. 8 and 9 also constitutes a part of this embodiment.

The ECC processor block 60 generates an ECC code using an encoder circuit within an encoder syndrome generator 62 on the basis of the user data (UD) transferred from the drive control block 50 at the time of writing the user data, and passes the generated code to the drive control block 50 to store it with the user data in the magnetic disk 2.

At the time of reading the user data, the drive control block 50 receives the user data and ECC read from the magnetic disk 2 via the read/write channel 9 and transfers them to the ECC processor block 60.

In the ECC processor block 60, a syndrome is generated using a syndrome generating circuit of the encoder syndrome generator 62, and the user data is stored in a first buffer within a first buffer control circuit 68.

After the end of generating the syndrome in the syndrome generating circuit, the ECC processor block 60 transfers the syndrome to a Euclid circuit 80 to construct an error locator polynomial and an error evaluator polynomial.

If two equations are completed, those equations are solved in a chien search circuit 90 to store the solved EL (Error location) and EP (Error pattern) in an error location/pattern register 74. If all the equations are solved, a CRC verifying circuit 110 verifies the validity for solved error location and pattern.

(First Feature Portion)

Referring to FIG. 3, a first feature of the hard disk drive 1 according to this embodiment will be described below.

The first feature is the provision of a command start detection circuit 66 for identifying the start of a command, a C2 sector discriminating circuit 67 for discriminating whether or not the sector contains C2, and an XOR circuit 64 for exclusive ORing an output of the first register 63 and an output of the second register 65. The operation of the above circuits will be apparent from the following discussion.

In performing the read/write operation, the command start detecting circuit 66 detects a CS signal indicating the start of command, and outputs a CL signal instructing to clear the stored state to the first register 63 and the second register 65. The first register 63 and the second register 65 are cleared by this CL signal. The encoder syndrome generator 62 is mainly composed of a fixed multiplier, which takes the sum of products every time one byte of user data is transferred, and the first register 63 latches the sum. This value is the syndrome at the read time, or the parity at the write time. At a timing when encoding or generating the syndrome for the last data in a series of data is ended, an LD (last data) signal is output from the drive control block 50. When this LD signal is output, the XOR circuit 64 exclusive ORs the value of the first register 63 storing the parity or syndrome of C2 generated by the data of one sector and the value of the second register 65, its result being saved in the second register 65.

When the data transfer for the next sector is started, an SS (sector start) signal is output, and the first register 63 is cleared upon receiving it. However, the second register 65 is not cleared by the SS (sector start) signal, but still holds a C2 parity or syndrome generated by the preceding sector.

After encoding or generating the syndrome for the last data in the second sector is ended, the LD (last data) signal is output. At this timing, the XOR circuit 64 exclusive ORs the value of the second register 65 holding the C2 parity or syndrome generated from the data in the second sector and the value of the C2 parity or syndrome generated from the data in the first sector, its result being saved in the first register 63. Through this operation, the C2 parity or syndrome is generated with the information word by exclusive ORing the data in two sectors. In the case where one block of C2 is composed of four sectors, the same operation is performed for the third sector and the fourth sector, whereby the C2 parity or syndrome with the information word by exclusive ORing the data in four sectors can be calculated without employing other memory elements.

Herein, if one block of C2 is composed of four sectors, because the fourth sector is a block containing C2, the C2 discriminating circuit 67 outputs a CS signal to the second register 65 continuously from the time of outputting the SS (sector start) signal for the fourth sector till the time of outputting the SS signal for the next sector. If the C2 signal and the SS (sector start) signal turn active, the second register 65 is cleared, and a preparation for generating the information word after exclusive ORing the data in the next four sectors is made.

In the above processing operation, the second register 65 is cleared when the CS signal is issued, and when the data transfer for the succeeding sector is started after the end of processing the sector containing C2. Accordingly, when writing the data from any sector within predetermined C2 block to the sector containing C2, the code word of C2 ranges from any sector to start writing to the sector containing C2, thereby enabling the error correction capability of C2. This means that in the case where it is desired that all the predetermined C2 block is the code word of C2, there is no need of once reading the sector not to be written to include it in the calculation of the C2 parity if the sector to be written begins from the middle of the block, before the start of actually writing the data. Accordingly, since the error correction capability of C2 can be used by reading the data from the written sector, the number of sectors for which the error correction capability of C2 is unusable is suppressed to the minimum, even if the read operation before write is omitted.

The hard disk drive 1 of this embodiment can operate at a read reference clock, because the encoder syndrome generator 62 does not need to once store the user data in the memory element such as SRAM. The first register 63 and the second register 65 can employ the original circuits of the ECC processor block 60. Accordingly, an increase in the number of gates can be suppressed to that of the associated portion with the XOR circuit 64. Since encoding the C2 portion may be made while writing each sector in the magnetic disk 2, it is possible to prevent the write performance from being worse due to an encoding delay caused by once inputting or outputting the user data into or from the memory element such as SRAM before the write operation.

(Second Feature Portion)

Figure 4:
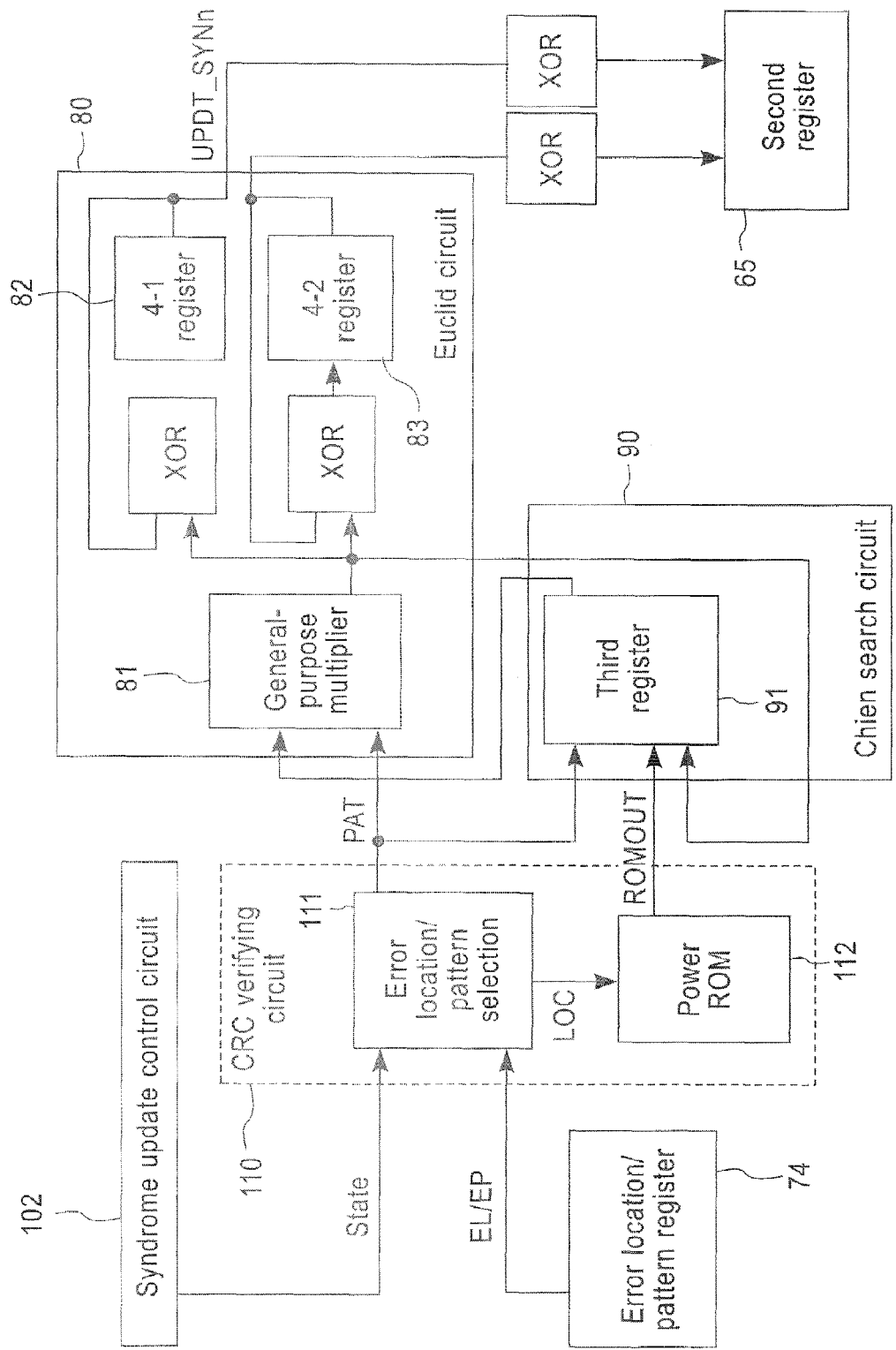
FIG. 4 is a block diagram of extracting a part of FIG. 3 to explain a second feature portion of the embodiment.

Referring to FIGS. 3 and 4, a second feature portion of this embodiment will be described below. FIG. 4 is a block diagram of extracting and embodying a part of FIG. 3.

This second feature portion is implementing the OTF with C2 and providing the syndrome for offline calculation of the ECC of C3 or more by updating C2 and C3 at high speed, without increasing the number of gates involving the syndrome update, after the end of making the error correction with C1.

For the second feature portion, it is presupposed that the hard disk drive 1 employing up to the C3 level operates the second register 65 used by the encoder syndrome generator 62 at the clock of the read/write channel 9 to reduce the number of gates, and the other blocks at the system clock of the hard disk drive 1.

If an ECC control circuit 100 solves the error location/pattern with C1, a CRC verifying circuit 110 ends the verification, and the error correction is determined to be correctly made, the state of modified syndrome results.

Since the second register 65 and the other blocks operate at asynchronous clocks, as presupposed above, a 4-1 register 82 and a 4-2 register 83 in the Euclid circuit 80 are firstly reset.

A syndrome update control circuit 102 in the ECC control circuit 100 operates a state with a role of selecting the syndrome updating process and the error location/pattern to be used, to select the error location/pattern to be used at the first time, using an error location/pattern selector 111 in the CRC verifying circuit 110. The selected error location (denoted as LOC) is input as the address for a Power ROM 112 in the CRC verifying circuit 110 to acquire the value of $\alpha$ to the power of LOC as ROMOUT. When updating the syndrome as previously described, the following expression is employed.

$$\mathrm{Syn}(n) = PATX\alpha^{(LOCXn)} n: 0 \text{ to order of } C3-1$$

A third register 91 in the chien search circuit 90 saves the value of $\alpha$ to the power of LOC, and calculates the value of $\alpha$ to the power of (LOC X n) up to the order of C3, using a general-purpose multiplier 81 in the Euclid circuit 80. If the required value of $\alpha$ to the power of (LOC X n) is acquired in the third register 91, the general-purpose multiplier 81 multiplies the error pattern and the value of $\alpha$ to the power of (LOC X n). The obtained value is saved in the 4-1 register 82 and the 4-2 register 83.

Then, if all the values of $\alpha$ to the power of (LOC X n) up to the order of syndrome from the second error pattern are acquired, a product of the error pattern and each value of $\alpha$ to the power of (LOC X n) is calculated, and the exclusive OR of the product and the value in the 4-1 register 82 is saved in the 4-1 register 82, while the exclusive OR of the product and the value in the 4-2 register 83 is saved in the 4-2 register 83.

Then, if all the values of $\alpha$ to the power of (LOC X n) up to the order of syndrome from the third error pattern are acquired, a product of the error pattern and each value of α to the power of (LOC X n) is calculated, and the exclusive OR of the product and the value in the 4-1 register 82 is saved IN the 4-1 register 82, while the exclusive OR of the product and the value in the 4-2 register 83 is saved in the 4-2 register 83.

If the above operation is repeated for all the errors, a difference for syndrome is obtained for all the errors that are solved.

Lastly, this difference (indicated by UPDT_SYNn in FIG. 4) is exclusive ORed with the term of each order of C2 and C3 in the second register 65, and stored in the second register 65, whereby the syndrome for correctable errors can be only updated. If interleave is employed, the above operation may be performed by the number of interleaves.

The second feature of this embodiment is that the ROM is only employed for acquiring the value of α to the power of LOC from the error location, but to acquire the value of α to the power of (LOC X n), the general-purpose multiplier 81 in the Euclid circuit 80 is employed, the third register 91 in the chien search circuit 90 is used as a working register for temporarily storing the value of α to the power of (LOC X n), and the third register 82 and the fourth register 83 in the Euclid circuit 80 is employed to store the value of difference to update the syndrome. Accordingly, the calculation cycle at the maximum speed can be attained without increasing the number of gates. Moreover, it is possible to provide the OTF of C2 on the basis of the syndrome update of C2, and the syndrome of C3 updated to decode C3 at once if the error is uncorrectable with C2, without substantially adding new gates.

(Third Feature Portion)

Figure 5:
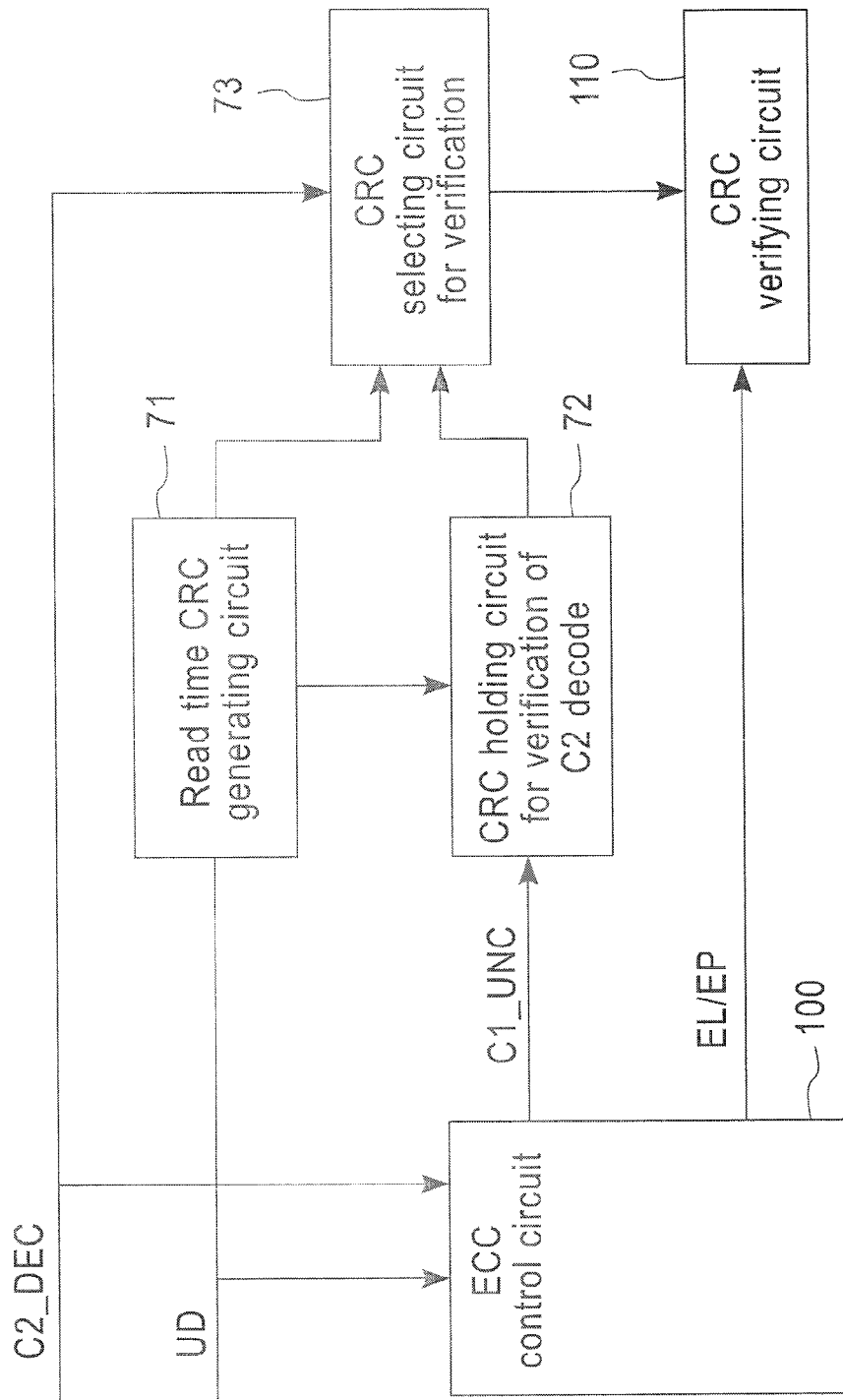
FIG. 5 is a block diagram of extracting a part of FIG. 3 to explain a third feature portion of the embodiment.

Referring to FIG. 5, a third feature portion of this embodiment will be described below. FIG. 5 is a block diagram of extracting and embodying a part of FIG. 3.

In the explanation here, it is supposed, for easier understanding, that the multiplication level of code is 2, and the codes of C1 and C2 are employed. And it is presupposed that C2 is a code with the information word by exclusive ORing the user data of four sectors, and the data is read in the order from sector 0 to sector 3, in which sector 1 is uncorrectable with C1.

The ECC control circuit 100 generates the syndrome for C1 and the syndrome for C2 on the basis of the user data of sector 0, while at the same time the read time CRC generating circuit 71 generates the CRC for verification, employing the user data transferred from the magnetic disk 2 with the possibility of containing the error. The ECC control circuit 100 calculates the error location/pattern if the syndrome is completed. The CRC verifying circuit 110 checks whether or not the CRC for verification is matched with the corresponding value when the error occurs, employing the error location/pattern. At this time, because C1 is decoded, C2_DEC indicating the decode of C2 is 0. Then, the CRC selecting circuit for verification 73 selects the output of the read time CRC generating circuit 71. The ECC control circuit 100 updates the syndrome that has been generated for C2, using the error location/pattern.

If the user data of sector 1 is transferred, the ECC control circuit 100 calculates the error location/pattern as in the sector 0, but if the error is uncorrectable in sector 1, C1_UNC as a signal indicating this is set to 1, and the output of the read CRC generating circuit 71 is copied to the CRC holding circuit for verification of C2 decode 72.

The next sector 2 is decoded for C1 in the same manner as in sector 0 to update the syndrome for C2 and verify CRC.

However, since the sector 3 contains C2, C2 is decoded at the same time as the end of decoding C1. If the error location/pattern is solved in decoding C2, the CRC selecting circuit for verification 73 selects the value of the CRC holding circuit for verification of C2 decode 72 that is held when the sector 1 is C1_UNC, as the CRC for verification. On the other hand, the CRC verifying circuit 110 verifies the corrected content, using this CRC for verification.

With the above operation, it is possible to verify the result of decoding C2 only with CRC for detecting the mis-correction of C1 ECC that is originally added to each sector, and there is no need of appending the CRC code for verifying the upper level code.

In the above, the explanation for up to C2 is made, but as the code is more multiple, the overhead of code can be decreased by reducing the CRC for each code.

And since there is no CRC for each code, when the error for each sector is solved, there is no need of updating the value of CRC, the circuit for updating the CRC is reduced and the decoding latency is shortened.

(Fourth Feature Portion)

Figure 6:
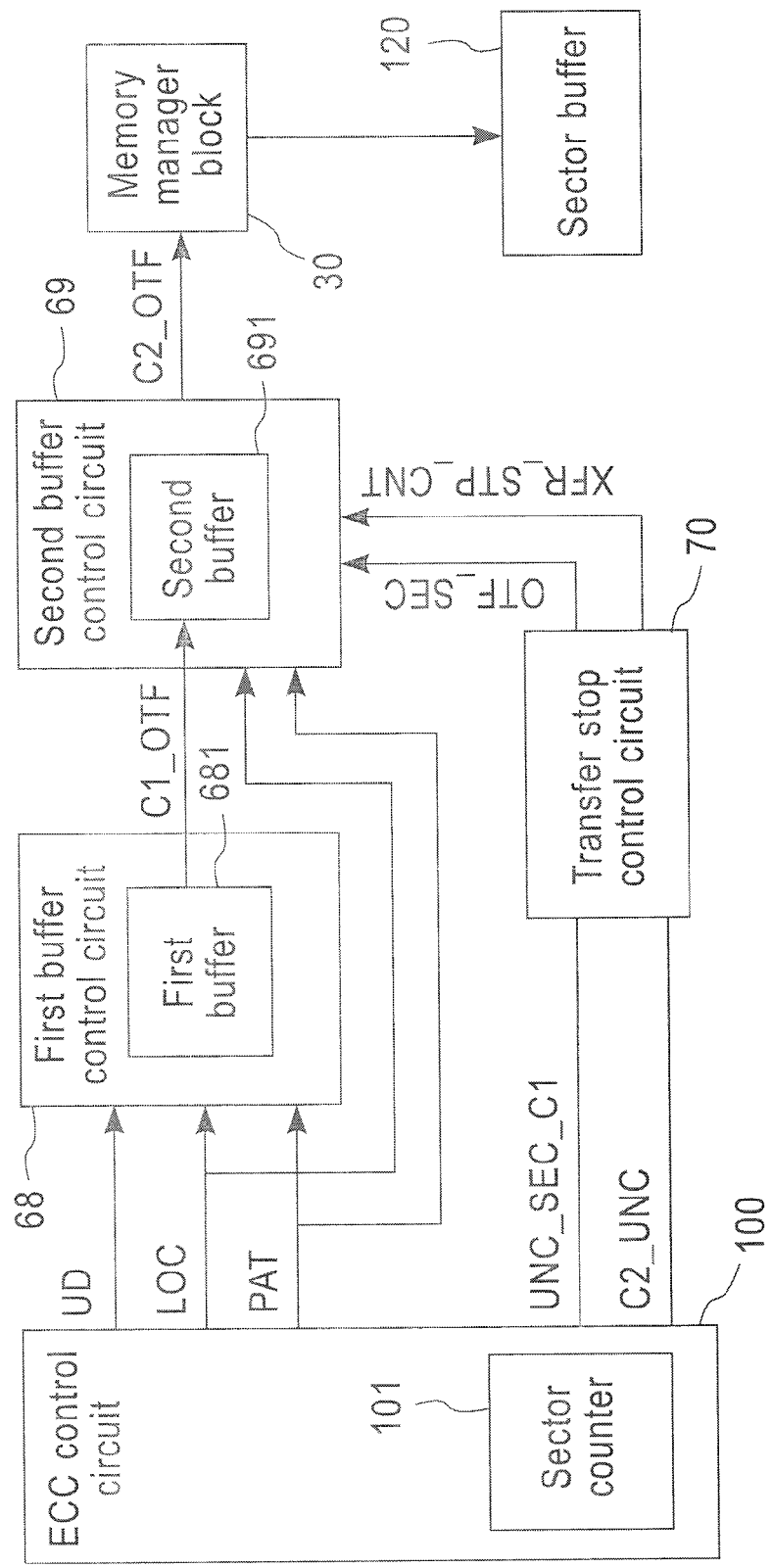
FIG. 6 is a block diagram of extracting a part of FIG. 3 to explain a fourth feature portion of the embodiment.
Figure 7:
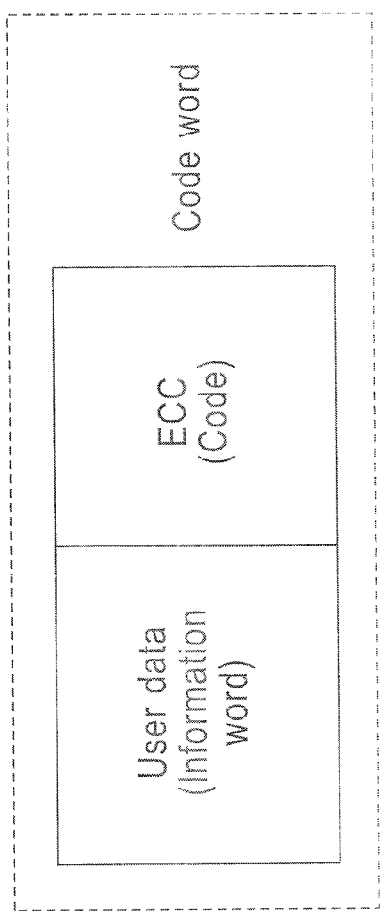
FIG. 7 is a diagram showing the conventional code word.

Referring to FIG. 6, a fourth feature portion of this embodiment will be described below. FIG. 6 is a diagram of extracting and embodying a part of FIG. 3.

The fourth feature portion uses a buffered correction with a double buffer structure.

To begin with, the buffered correction is a method in which the data read from the magnetic disk 2 is once stored in a buffer composed of SRAM within the HDC, and after the end of decoding that sector, the sector data is transferred to a sector buffer 120, while making the error correction. As described previously, the conventional OTF loses a wide band of memory. The buffered correction eliminates this trouble.

Figure 11:
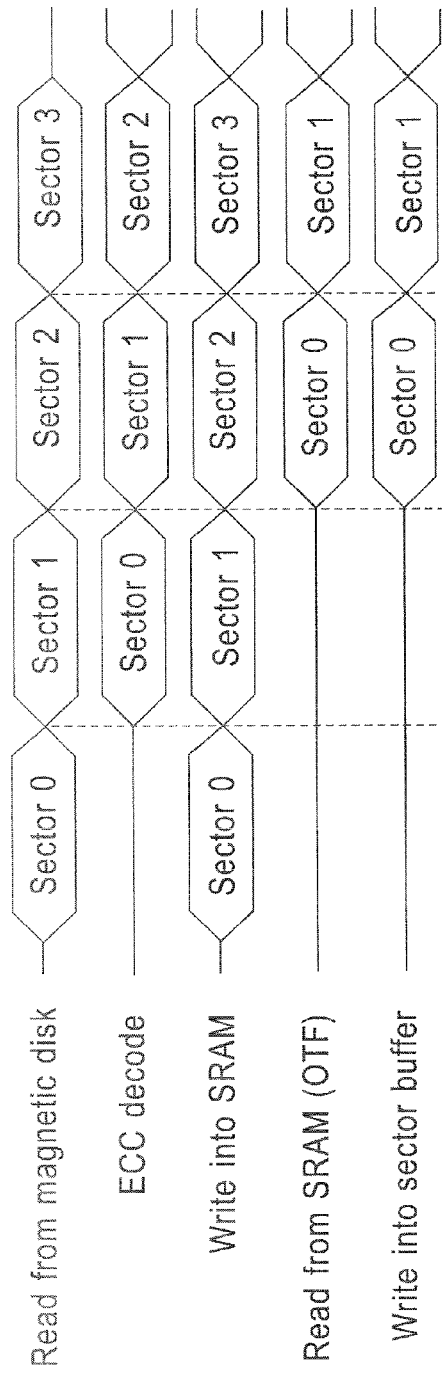
FIG. 11 is a timing chart showing the conventional operation of buffer correction.

FIG. 11 is a timing chart for the buffered correction in a simple form with one buffer. As will be apparent from FIG. 11, access to the sector buffer is only made at the time of writing the data after OTF, whereby the band loss arising with the conventional OTF can be eliminated. Accordingly, the data transfer at high rate can be made with a cheap DRAM or DRAM having low operation frequency.

Herein, when the multilevel of code is 2 and the codes of C1 and C2 are employed, the OTF up to the C2 level is implemented.

The conventional buffered correction is made for C1, and for C2, after the sector is transferred to the sector buffer 120, the OTF of C2 is made on the sector buffer 120. In this case, the band loss of the sector buffer with the OTF of C1 is zero, but the OTF of C2 is a factor of lowering the band of sector buffer. Since there is no margin in that the OTF of C1 is once read, corrected, and then rewritten (RMW), the band loss of the sector buffer 120 is increased, if the OTF of C2 having greater error correction capability than C1 is made by RMW, even though the buffered correction is made.

To decode C2, it is required to read consecutive four sectors. Which sector is an object of the OTF with C2 among the four sectors is not decided. Accordingly, it is required to deal with the consecutive four sectors subjected to the OTF with C1 in making the OTF with C2. Thus, to facilitate the management of LBA (Logical Block Address) for which the error correction is completed after reading, the OTF is made using the double buffer structure in this embodiment.

Referring to FIG. 6, the OTF control with the double buffer structure will be described below. In FIG. 6, a first buffer 681 and a second buffer 691 are separately drawn, but actually, they are realized with a single SRAM to provide the first buffer 681 and the second buffer 691 with a boundary at a specific address in an address space.

First of all, the ECC control circuit 100 transfers the user data to the first buffer control circuit 68, and stores it in the first buffer 681.

Thereafter, when the ECC control circuit 100 ends to decode the ECC with C1 of sector 0, the first buffer control circuit 68 performs the OTF (indicated as C1_OTF), using the error location/pattern obtained from the ECC processor block 60, while reading the user data of sector 0 from the first buffer 681. And the user data of corrected sector 0 is transferred to the second buffer control circuit 69, and stored in the second buffer 691. The first drive buffer control circuit 68 transfers the user data to the second buffer 691 in a unit of sector at any time.

A sector counter 101 in the ECC control circuit 100 is incremented by one for every sector processed, but cleared to zero for every C2 sector. Accordingly, the location of sector within the C2 block can be specified based on the value of this sector counter 101.

If the ECC control circuit 100 determines that an uncorrectable error occurs by decoding the C1, the OTF is performed for the sector corresponding to the value of the sector counter 101 at that time when the decode of C2 is ended. Also, if the ECC control circuit 100 determines that an uncorrectable error occurs in the decode of C2, the information (indicated as UNC_SEC_C1) for specifying the sector to stop the transfer from the second buffer 691 is passed to a transfer stop control circuit 70.

The ECC control circuit 100 decodes C2 if the sector containing the C2 ECC is read, decoding C1 in that sector is ended, and an uncorrectable error with the decode of C1 occurs within the C2 block. If the sector having uncorrectable error with C1 is determined to be uncorrectable with the decode of C2, the transfer stop control circuit 70 sets the number of sectors (4) within the C2 block to XFR_STP_CNT, supposing that the information of sector having UNC_SEC_C1 as an object for the OTF is OTF_SEC, and passes it to the second buffer control circuit 69. The second buffer control circuit 69 reads the user data of sector 0, the user data of sector 1, and the user data of sector 3 in the order from the second buffer 691, while transferring the user data of C2 block (four sectors) to the memory manager block 30, in which for the sector indicated by OTF_SEC, the OTF is performed, employing the error location/pattern obtained from the ECC control circuit 100 at the time of decoding C2.

The second buffer control circuit 69 transfers the user data in a unit of C2 block (four sectors) as long as an uncorrectable error does not occur in the decode with C2.

With the above operation, the OTF of the C2 block and the OTF of consecutive C2 block can be implemented without band loss of the sector buffer. In transferring the user data from the second buffer 691 to the memory manager block 30, the memory manager block 30 increments by one the LBA information indicating the valid sector reproduced correctly every time all the user data for each sector is received, whereby the LBA information can be managed by +1 at any time as conventionally.

The operation when the sector that is uncorrectable in the decode of C1 is determined to be uncorrectable in the decode of C2 will be described below.

When the sector is determined to be uncorrectable in the decode of C2, the ECC control circuit 100 outputs C2_UNC as the signal indicating this. The transfer stop control circuit 70 receives C2_UNC, and sets XFR_STP_CNT to UNC_SEC_C1. Thereafter, the second buffer control circuit 69 reads the sector as indicated by XFR_STP_CNT from the second buffer 691, and transfers it to the sector buffer 120. At this time, since the sector is uncorrectable in the decode of C2, the OTF is not performed. Moreover, this method is implemented by saving the error location/pattern of one sector for each of C1 and C2, and has a merit that there is no need of having the registers for saving the error location/pattern for four sectors.

ADVANTAGES OF THE INVENTION

As above described, with the development of an ECC processor supporting the ISF, the present invention makes it possible to avoid a hardware error due to a large deletion of about 100 bytes or scratch, which conventionally resulted in the hardware error.

And a decoder or a syndrome update circuit is designed so that C1 and C2 are shared as much as possible, whereby the logic size can be suppressed to the minimum.

Moreover, the overhead of code can be suppressed lower than the conventional overhead, whereby the error correction capability can be improved.

DESCRIPTION OF SYMBOLS

1 . . . hard disk drive
2 . . . magnetic disk
3 . . . magnetic head
4 . . . VCM coil
5 . . . actuator arm
6 . . . AE (Arm Electronics)
7 . . . control portion
8 . . . VCM control portion
9 . . . read/write channel
10 . . . HDC/MPU
11 . . . RAM
12 . . . host interface
13 . . . ROM
14 . . . host computer
20 . . . host control block
30 . . . memory manager block
40 . . . MPU
50 . . . drive control block
60 . . . ECC processor block
62 . . . encoder syndrome generator
63 . . . first register
64 . . . XOR circuit
65 . . . second register
66 . . . command start detecting circuit
67 . . . C2 discriminating circuit
68 . . . first buffer control circuit
69 . . . second buffer control circuit
70 . . . transfer stop control circuit
71 . . . read time CRC generating circuit
72 . . . CRC holding circuit for verification of C2 decode
73 . . . CRC selection circuit for verification
74 . . . error location/value register
80 . . . . Euclid circuit
81 . . . general-purpose multiplier
82 . . . 4-1 register
83 . . . 4-2 register
90 . . . chien search circuit
91 . . . third register
100 . . . ECC control circuit
101 . . . sector counter
102 . . . syndrome update control circuit
110 . . . CRC verifying circuit
111 . . . error location/pattern selector 112 .... Power ROM
110 ... CRC verifying circuit
120 ... selector buffer

The invention claimed is:

1. A data storage device comprising:
   a disk storage medium having a plurality of sectors containing the user data wherein each of the plurality of sectors comprises a subdivision of a track;
   a head for performing a writing process or a reading process into or from said disk storage medium upon a write command or a read command transferred from a host; and
   error correcting means for correcting an error that occurs in said data during said reading process;
   wherein said error correcting means makes the error correction, using a first error correcting code appended to each of a plurality of sectors and a second error correcting code appended to said sector for every block composed of a predetermined number of sectors; and comprises:
   a syndrome generator for generating a syndrome on the basis of said user data;
   a Euclid circuit for constructing an error locator polynomial and an error evaluator polynomial on the basis of the syndrome generated by said syndrome generator;
   a chien search circuit for solving said error locator polynomial and said error evaluator polynomial; and
   a verification circuit for verifying the validity of the solutions of said error locator polynomial and said error evaluator polynomial in said chien search circuit;
   wherein an operation process for updating said syndrome after the end of making an error correcting process with said first error correcting code is performed using said Euclid circuit and said chien search circuit, wherein said Euclid circuit comprises a general-purpose multiplier, said chien search circuit comprises a first register and said operation process is performed by said general-purpose multiplier to acquire a first operation result, which is saved temporarily in said first register.

2. The data storage device according to claim 1, wherein said general-purpose multiplier further performs said operation process, using the result of said operation process saved temporarily in said first register, to acquire a second operation result.

3. The data storage device according to claim 2, wherein said Euclid circuit comprises a second register to generate a value for updating the syndrome on the basis of said second operation result.

4. The data storage device according to claim 1 wherein a third error correcting code is appended to said sector for every block composed of a predetermined number of sectors.

5. A data processing method to correct data for errors, using a first error correcting code appended to a plurality of sectors and a second error correcting code appended to each sector for every block composed of a predetermined number of sectors, said method comprising:
   generating a syndrome on the basis of said data by a syndrome generator;
   calculating an error locator polynomial and an error evaluator polynomial on the basis of said generated syndrome;
   solving said error locator polynomial and said error evaluator polynomial; and
   verifying the validity of the solutions of said error locator polynomial and said error evaluator polynomial with a chien search circuit;
   wherein each of the plurality of sectors comprises a subdivision of a track; and
   wherein an operation process for updating said syndrome after performing an error correcting process with said first error correcting code is performed by calculating said error locator polynomial and said error evaluator polynomial and solving said error locator polynomial and said error evaluator polynomial, wherein calculating the error locator polynomial and the error evaluator polynomial comprises a multiplying algorithm and solving the error locator polynomial and the error evaluator polynomial comprises storing results in a first register, and said operation process is performed by said multiplying algorithm to acquire a first operation result, which is saved temporarily in said first register.

6. The data storage method according to claim 5 wherein a third error correcting code is appended to said sector for every block composed of a predetermined number of sectors.

7. The data processing method according to claim 5, wherein said multiplying algorithm further performs said operation process, using the result of said operation process saved temporarily in said first register, to acquire a second operation result.

8. The data processing method according to claim 7, wherein calculating the error locator polynomial and the error evaluator polynomial comprises generating a value for updating the syndrome on the basis of said second operation result and storing the generated value in a second register.

* * * * *